(No Model.)
D. BARKER.
MOLD FOR FORMING SCREW CAPS.
No. 330,545. Patented Nov. 17, 1885.
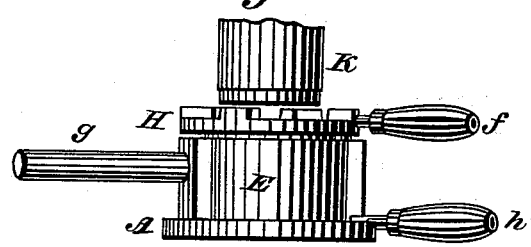
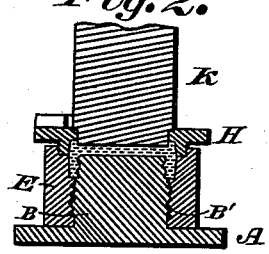
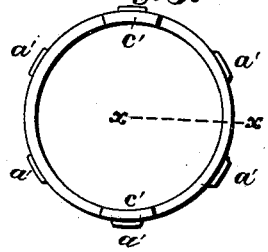
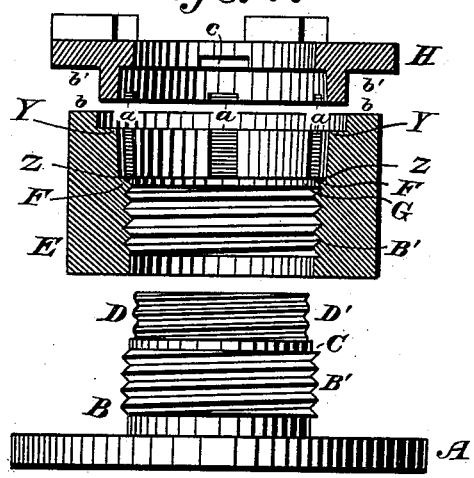
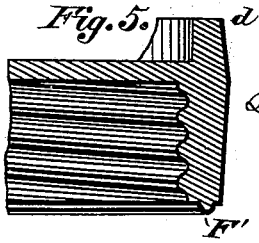
WITNESSES:
Harry Frease
Chas R. Miller
INVENTOR
David Barker
BY
W K Miller
ATTORNEY

UNITED STATES PATENT OFFICE.

DAVID BARKER, OF CANTON, OHIO, ASSIGNOR TO THE CANTON GLASS COMPANY, OF SAME PLACE.

MOLD FOR FORMING SCREW-CAPS.

SPECIFICATION forming part of Letters Patent No. 330,545, dated November 17, 1885.

Application filed June 12, 1885. Serial No. 168,539. (No model.)

*To all whom it may concern:*

Be it known that I, DAVID BARKER, a citizen of the United States, and a resident of Canton, county of Stark, State of Ohio, have invented a new and useful Improvement in Molds for Forming Glass Screw-Caps, of which the following is a full, clear, and exact description, reference being had to the accompanying drawings, making part of this specification.

My invention relates to improvements in molds for forming internally-threaded pressed glass screw-caps for fruit-jars and similar uses.

In the drawings, Figure 1 represents an exterior view; Fig. 2, a vertical section; Fig. 3, a view of the top of a glass cap; Fig. 4, a sectional view, and Fig. 5 a view in section of a full-size glass cap.

Letters of reference refer to like parts.

In Fig. 4, A represents a bottom plate, on which rests the hub B. These parts may be integral or separate. The hub is cylindrical in form, and of a diameter greater than the inside of the mold. The upper end of the hub B is reduced to the size required for the center die required to form the internal thread of the screw-cap, which reduction terminates at the shoulder C. The lower end of the hub B is provided with a V-shaped screw-thread around its periphery, and the upper end, D, from the top to the shoulder C, with a screw-thread, D', of the same pitch, but a rounded thread instead of a V, hereinafter explained, the mold E having a central opening of the same diameter as the hub B, having an inside screw-thread of the same pitch as that on the outside of the hub B, and adapted to run up and down on the outside of the hub, as desired. The upper portion of the mold E is turned out on the inside to form a cavity or mold to shape or give form to the outside of the screw-cap. The wall or side of this mold is made on lines slightly diverging from Z to Y, giving to the mold a smaller diameter on a line from Z to Z than from Y to Y. At the bottom of the mold, on a line from Z to Z, there is an annular rib, G, in the upper face of which there is an annular groove, F, semicircular in form, which forms a rib, F', on the lower edge of the screw-cap. The face of the mold is provided with grooves *a*, which form the ribs *a'* on the outside of the screw-cap and prevent it from slipping or turning in the mold. The ring H forms a top for the mold, and is adapted thereto, as seen in Fig. 4, by the receptacle *b*, provided in the top of the mold E and the receptary *b'* on the under side of the ring. The ring H is turned out on the inside to form the top part, *d*, of the screw-cap shown in Fig. 5, and is provided with depressions *c*, which form the projections *c'*. The several parts are provided with handles *f g h*, as seen in Fig. 1. When the mold E is turned down on the V-thread D' on the hub B, the under side of the annular rib G will rest on the shoulder C on the hub. These two surfaces, being at right angles with a vertical line drawn through the working parts of the mold, not only center the parts in working position, but take all strain off from the screw B' and prevent it from becoming tight on the hub B, and the annular rib G, resting on the shoulder C, is not liable to injury from the downward pressure on the mold. The thread D' on the center or stem die is rounded, as distinguished from a V and other forms of screws, to adapt it to a thread-blow on the neck of a fruit-jar, as the sharp lines cannot be maintained by that process of manufacture.

The operation of the mold is as follows: Turn the mold E down on the hub B, and then put the ring H in position, as shown in Fig. 1. The molten glass is then dropped into the mold-cavity. The plunger K is then brought down with great force, which presses the glass in and around the stem-die, and all parts of the mold-cavity, as shown in Fig. 2. The plunger K is then raised, the ring H removed, and by taking hold of the handles *h* and *g*, and after turning the handle *g* to the right and three times around the hub H, the mold may be turned over and the screw-caps dropped out into plates provided to receive them, when the operation may be repeated.

The advantage of this construction of a mold over others consists in the ease and rapidity of operation and the superiority of the article so made, as it will be seen that when the mold E is moved by the handle *g*, turning it up on the thread B', the annular rib projecting inwardly and under the glass, which is now formed into the mold, supports and carries up the glass while the stem-die is being removed, and the diverging sides of the mold support the sides of the screw-cap, and the glass having formed into the grooves prevent its turning in the mold, leaving the working parts of the cap, the inside thread of the lower or closing edge with the annular rib F, as perfect as the mold. The rib F', when the cap is turned down on the threaded neck of a can, will indent itself in the rubber band placed on the shoulder of the can, and by slight pressure form a perfect joint.

I am aware that it is not new in the manufacture of glass screw-caps to employ a screw-threaded hub having a threaded stem-die and a shoulder between the stem and hub, and an open mold adapted to fit around the stem-die, and hence I make no broad claim to these parts. In my device the hub is adapted to engage the open mold, and the latter is provided with a shoulder corresponding to the shoulder between the stem and die.

Having described my invention and explained the operation thereof, what I claim and desire to secure by Letters Patent, is—

1. In a mold for making glass screw-caps, the combination, with a supporting-plate provided with a screw-threaded hub, a central stem-die, screw threaded as described, and a shoulder between the stem and hub, of the open mold having a female screw corresponding in pitch to the screw-threads on the hub, and an annular shoulder, G, substantially as set forth.

2. In a mold for making glass screw-caps, the combination of a supporting-plate, A, the screw-threaded hub B, the shoulder C, the stem-die, threaded as described, the open mold E, provided with a female screw adapted to the hub B, the annular rib G, having a groove, F, and the loose open ring, as described and shown, and for the purpose set forth.

3. In a mold for making glass screw-caps, the open mold E, provided with a female screw, the annular rib, as described, and the diverging wall or side of the mold, as described, and for the purpose set forth.

In testimony whereof I have hereunto set my hand this 8th day of June, A. D. 1885.

DAVID BARKER.

Witnesses:
CHAS. R. MILLER,
W. K. MILLER.